W. A. WOOD.
DRIVE WHEEL FOR HARVESTERS.
No. 88,938. Patented Apr. 13, 1869.
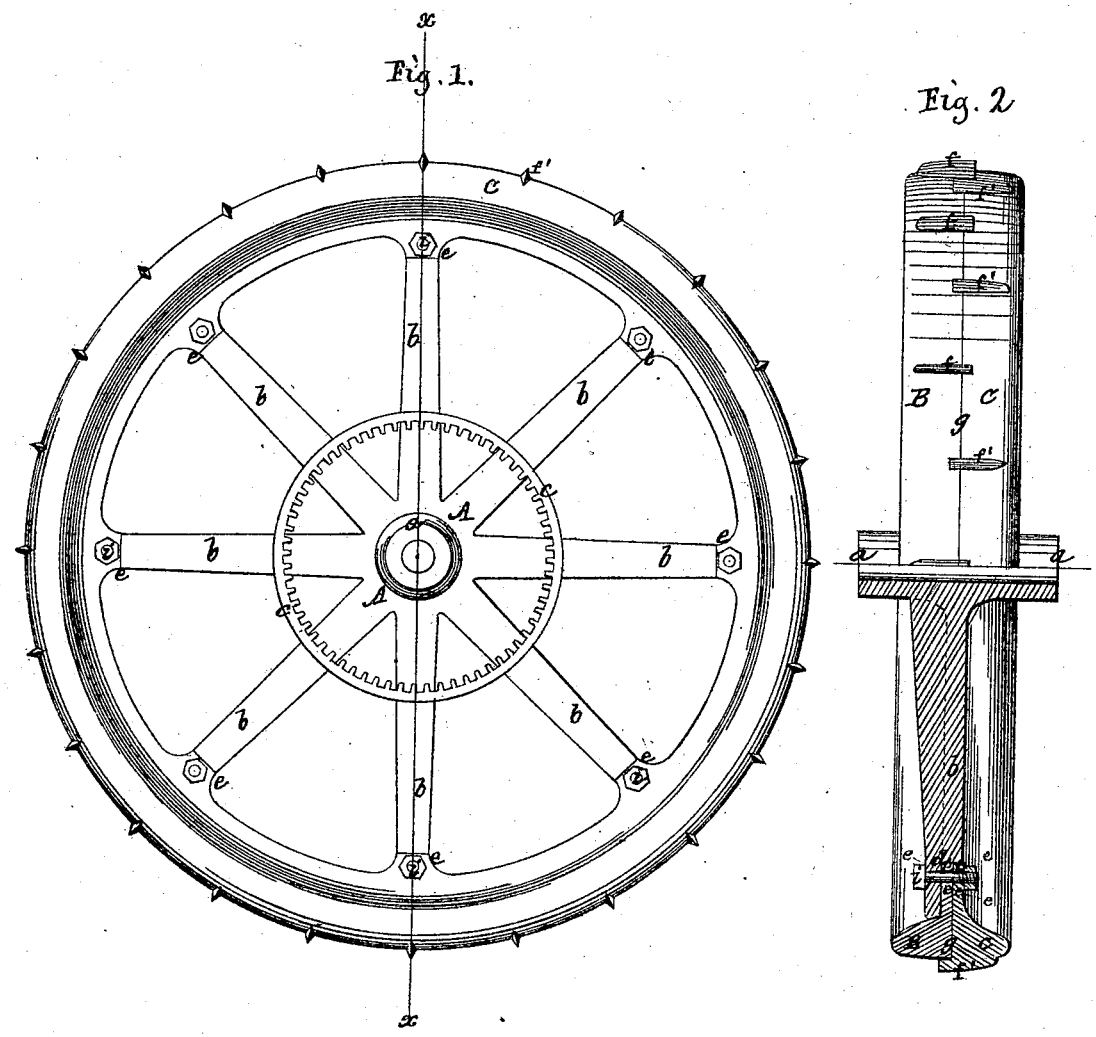

WALTER A. WOOD, OF HOOSICK FALLS, NEW YORK.

Letters Patent No. 88,938, dated April 13, 1869.

IMPROVEMENT IN DRIVE-WHEELS FOR HARVESTERS.

The Schedule referred to in these Letters Patent and making part of the same.

*To all whom it may concern:*

Be it known that I, WALTER A. WOOD, of Hoosick Falls, in the county of Rensselaer, and State of New York, have invented certain new and useful Improvements in Main Driving and Supporting-Wheels for Harvesting-Machines; and I do hereby declare the following to be a full, clear, and exact description of the same, reference being had to the accompanying drawings, making a part of this specification, in which—

Figure 1 is a side elevation of the wheel, and

Figure 2, an edge view of the same, partially in section, as a section would appear if taken at the red line $x \, x$ of fig. 1.

Similar letters of reference, where they occur in the separate figures, denote like parts of the wheel in both of the drawings.

My invention consists in casting a main drive-wheel, for a harvesting-machine, in three sections, and uniting the sections into one by bolts or rivets, as will be explained.

To enable those skilled in the art to make and use my invention, I will proceed to describe the same with reference to the drawings.

The central portion, A, of the wheel, which comprises the hub $a$, spokes $b$, and geared rim $c$, is cast in one piece, the rim being on the spokes, somewhat remote from the centre of the wheel, and the ends of the spokes recessed or shouldered, as seen at $d$, fig. 2, to let in the flanges of the rim.

The rim is cast in two parts, B C, each part having a series of internal-projecting lugs, $e$, corresponding to the number of spokes $b$ on the interior part; and upon the perimeters of the two parts B C are cast transverse ribs $f f'$, which are designed for taking hold on the ground, and preventing the drive-wheel from slipping.

The ribs $f f'$, on each section of the rim, project beyond the line of union between the two when put together, ($g$, fig. 2, being that line,) so that they lap over the joint, and thus give great strength to the wheel.

The ribs $f$, as seen in fig. 2, are cast upon the part B, and the ribs $f'$ are cast upon the part C. Each of the series of ribs passes over the joint $g$, between the two parts, and prevents any slip of one upon the other.

The lugs $e$, on the two parts B C, come opposite each other, and when together, fit snugly in the recesses $d$, in the ends of the spokes, and bolts $i$ being passed through the series, make a very rigid wheel, which, owing to its size, quantity of metal, shape, and unequal contraction, could not, with any economy or certainty, be cast in one piece; and, though this wheel is designed for harvesting-machines, it could be advantageously used for the driving-wheel of any other machine getting its motion from traction in locomotion over the ground.

Having thus fully described my invention,

What I claim therein as new, and desire to secure by Letters Patent, is—

A main drive-wheel, for harvesting and other similar machines, composed of the three parts A B C, united and held together, as and for the purpose herein described and represented.

WALTER A. WOOD.

Witnesses:
C. A. CHENEY,
A. C. GEER.